United States Patent [19]

deVial et al.

[11] 4,167,012
[45] Sep. 4, 1979

[54] CHART-RECORDING

[75] Inventors: Raymond M. deVial, Beckenham; Philip Cowlin, Sevenoaks, both of England

[73] Assignee: Babcock Controls Limited, Croydon, England

[21] Appl. No.: 875,870

[22] Filed: Feb. 7, 1978

[30] Foreign Application Priority Data

Feb. 9, 1977 [GB] United Kingdom ................. 5310/77

[51] Int. Cl.² .............................................. G01D 9/34
[52] U.S. Cl. ......................................... 346/62; 346/93
[58] Field of Search ....................... 346/62, 20, 93, 50, 346/49, 59

[56] References Cited
U.S. PATENT DOCUMENTS

| 2,390,364 | 12/1945 | Gibbs | 346/66 X |
| 3,237,171 | 2/1966 | Young | 346/20 X |
| 3,573,843 | 4/1971 | Solley | 346/62 X |
| 3,681,774 | 8/1972 | Harris | 346/62 |

Primary Examiner—Joseph W. Hartary
Attorney, Agent, or Firm—Kemon & Estabrook

[57] ABSTRACT

A recording system with a chart recorder having a movable pen arranged for providing a record on a moving chart of the varying value of a variable has the feature that means are arranged for causing the pen repetitively, at intervals or at selected moments or occasions to execute a traverse on the chart and in so doing to record the current value of a second variable on the chart in binary representation by marking or not marking chart zones crossed in the traverse and allotted to respective information bits for the second variable value. A particular application of the system provides repetitive recordings on the chart of clock and calendar times. Each recording of the second variable is clearly distinguishable from the record trace of the first variable and scarcely interrupts the continuity of the latter.

7 Claims, 8 Drawing Figures

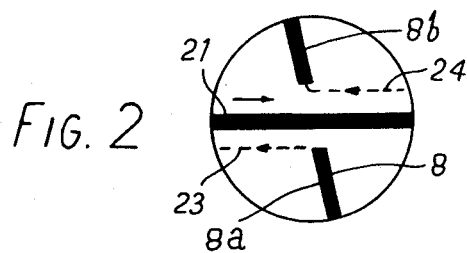
FIG. 2
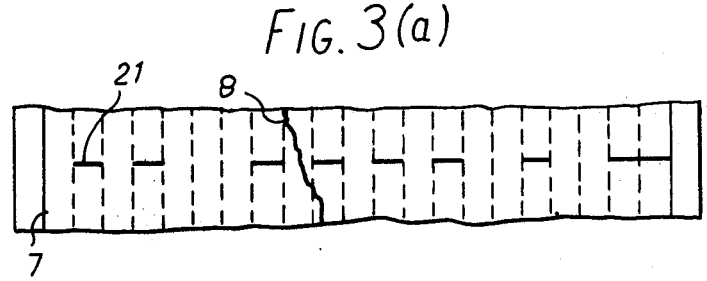
FIG. 3(a)
FIG. 3(b)
0 1 0 1 0 0 0 1 0 1 0 1 0 0 1 0 0 1 1
FIG. 3(c)
| TENS | UNITS | TENS | UNITS | TEN | UNITS | UNITS |
|------|-------|------|-------|-----|-------|-------|
| HOUR | | DAY | | MONTH | | YEAR |
| BCD RECORDED CURRENT TIME | | | | | | |
FIG. 3(d)  14 HOURS    15 DAYS   9 MONTHS   3 YEARS
FIG. 3(e)  2 PM   15TH SEPTEMBER   A.D. XXX3

CHART-RECORDING

This invention relates to chart recording the values of a variable. In particular it relates to recording systems with a chart recorder having a movable pen arranged for providing a record on a moving chart of the varying values of a variable.

BACKGROUND OF THE INVENTION

The chart-recording of a variable provides a preserved visible account of how the value of the variable alters during the running period of the recorder. If the recording of the variable to a high degree of accuracy and/or for a large range of values of the variable is required it may be necessary to allow a large range of pen movement on the chart.

There may in many cases be a second variable the values of which may be of use in conjunction with the values of the first variable or for interpreting the significance of the values of the first value. It is known to record the values of such a second value simultaneously with the first variable by means of a second pen movable over the same chart, but if this expedient is adopted it may be necessary to confine the two pen movements to respective zones of the chart in order to preclude confusion between the two traces or between the relevant graduations.

When considering this difficulty we perceived that in many cases it may not be essential to record the second varaible continuously and an object of the invention is to provide a chart-recording system with chart-recording of a first variable with a pen in for example any normal way coupled with recording of the second variable on the same chart repetitively, at intervals or at selected moments or occasions in a way which enables the records of the two variables to be clearly distinguished and which does not demand any diminution in the pen movement range allotted for the recording of the first variable.

SUMMARY OF THE INVENTION

In accordance with the present invention, a recording system with a chart recorder having a movable pen arranged for providing a record on a moving chart of the varying values of a variable is provided also with means arranged for causing the pen repetitively, at intervals or at selected moments or occasions to execute a traverse on the chart and in so doing to record the current value of a second variable on the chart in binary representation by marking or not marking chart zones crossed in the traverse and allotted to respective information "bits" (binary digits) for the second variable value.

From one aspect current time, as distinct from the elapsed time from the start of a recorder run, may be regarded as a relevant second variable and in many cases it may be of considerable utility to record current times, for example, clock and calendar times, at intervals on a chart on which a variable value is being recorded. If the variable is the quality of a waste liquid or smoke being discharged to the environment, for example, chart records of the variable with current times periodically recorded thereon will be of more immediate us for legal purposes concerned with anti-pollution regulations than chart records for the full significance of which legal investigations, for example, through journal or register entries of recorder starting times, may be necessary.

As another example of the application of the invention, in the paper-making industry it is common to record continuously the viscosity of a long-cycle periodic flow of slurry. It may be useful, if a change in viscosity is indicated on the record, to be able to assign it subsequently to the appropriate part of the flow, but it may not be considered necessary to provide for continuously recording also the increasing quantity of slurry that has passed the viscosity-monitoring point. The present invention makes it possible to record intermittenly the integrated quantity of slurry passing the point, recording it on the same chart that is provided for the viscosity record and by the same pen but providing records of the integrated quantity that are completely distinguishable from the viscosity record.

DESCRIPTION OF THE DRAWINGS

The invention will now be described by way of example with reference to the accompanying drawings, in which FIG. 2 is a magnified view of where on the chart seen in FIG. 1 the line of a trace recording the variable and the line of a current-time record cross one another, FIGS. 3(a), (b), (c), (d) and (e) are diagrams, numbers and letter-press used in the explanation of how a binarily represented current-time record is to be interpreted, and FIG. 4 refers to modifications and alternatives concerned with periodically or intermittently binarily representing on the chart a second variable pre-supposed to be other than current time and shows interconnections for such purposes of devices represented in block diagram fashion providing for the appropriate control of the recorder pen.

DESCRIPTION

Figure 1:
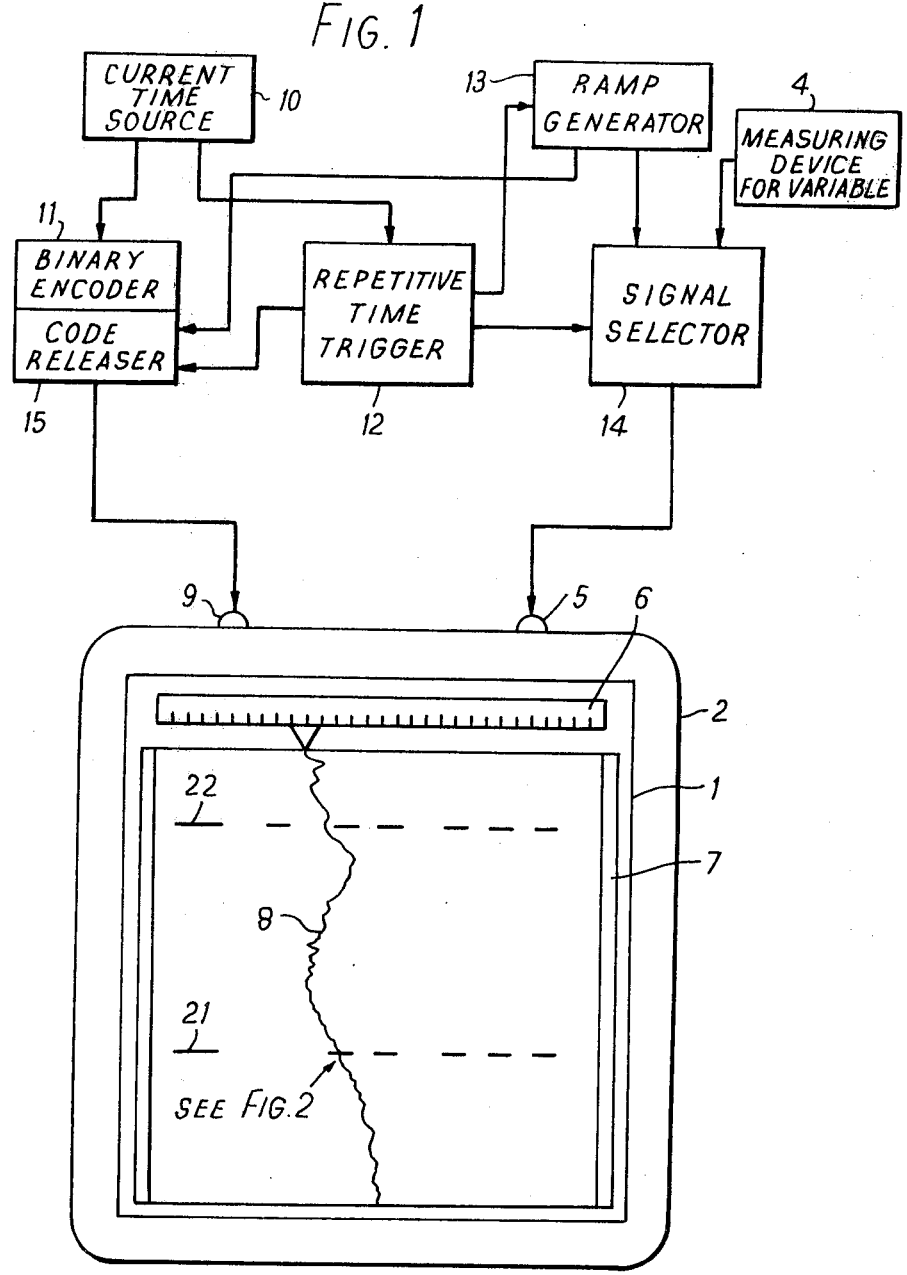
FIG. 1 shows the face of a chart recorder and the interconnection of devices represented in block diagram fashion providing for the control of the recorder pen both to record a variable value and to record current time repetitively in binary representation.

With reference to FIG. 1 of the drawings, in a vertical window 1 of an indicating chart recorder 2 of a conventional kind there is visible a pen 3 arranged to be positioned along a horizontal range of possible travel in the recorder by signals from a measuring device 4 to a pen drive input terminal 5 of the recorder. For indicating purposes there is provided alongside the path of horizontal travel of the pen a stationary scale boldly graduated to make it easy to ascertain from the position of the pen the current value of the variable. There is also visible in the window a length of chart 7 which is arranged to be steadily slowly unrolled from a stock spool (not shown), moved downwardly across the window 1 and collected up on a take-up spool (not shown). The pen 3 is arranged to record on the chart, which is suitably graduated (the graduations are not shown) so that from the pen trace 8 produced on the chart the varying values of the variable over the whole period taken to fill the chart may be ascertained when the recorded chart, removed from the recorder, is consulted at a later time.

The pen 3 records on the chart by marking it. For the purpose of repetitively recording the current time on the chart by methods and apparatus now to be described we require to be able to make and to break the marking capability of the pen and we ensure that the chart recorder has a pen WRITE/NOT-WRITE input terminal 9 arranged so that the application of suitable electrical signals thereto will cause the pen either to mark the chart or not to mark it. In this kind of chart recorder nowadays it is quite common for the pen to be given a voltage and to be arranged to mark electro-sensitively. If the pen is arranged to mark electro-sensitively it may be only a matter of applying a suitable voltage at the input terminal 9 to make the marking capability of the pen and of applying zero voltage at the said terminal to break the pen's marking capability. If, however, the chart recorder has an inking pen means must be provided for raising the pen from the chart when the input terminal 9 receives a NOT-WRITE signal and lowering it onto the chart again when the said input terminal receives a WRITE signal.

For the purpose of repetitively recording the current time on the chart, the source 10 of the current time to be recorded may be a public clock if it is reliable and independent of town power failures and if it can be arranged to be a source of time signals. In any case the current time source should be a time-keeping unit unaffected by circumstances touching the chart recorder such as whether the chart is being driven or not and whether a signal from the variable is being passed through to position the pen or not. If it is not a public clock, it may be low-power-demand stable-speed unit such as one based on a quartz-crystal-controlled electric oscillator and if desired or required driven independently of external circumstances including electric power mains failures by virtue of being powered by for example dry cells.

Time signals from the current time source are led to a binary encoder 11, which generates, changing it each hour as current time proceeds, and holds within itself, an array of twenty-one bit signals comprising six bits for a binary-coded decimal representation of the ordinal number of the hour in the day on the twenty-four-hour clock; six bits for a binary-coded decimal representation of the ordinal number of the day in the month; five bits for a binary-coded decimal representation of the ordinal number of the month in the year; and four bits for a binary-coded representation of the units figure of the date year.

Time signals from the current time source are also led to a repetitive time trigger 12, which is arranged once each hour to take a sequence of three actions for controlling a ramp generator 13, a signal selector 14 and a code releaser 15 associated with the binary encoder 11.

The ramp generator 13 is arranged to carry normally at its output a signal which, if it were applied to the pen drive input terminal 5, would cause the pen drive mechanism in the recorder to take the pen to the left extremity of its travel. The ramp generator is also arranged to generate at its output, as the consequence of receiving a triggering pulse from the time trigger 12, instead of its normal output signal a changing or ramp signal which, applied to the pen drive input terminal 5, will cause the pen drive mechanism to make the pen execute a traverse from the left extremity to the right extremity of its possible travel, after which the ramp generator output reverts to normal.

The signal selector 14 is in the signal line from the measuring device 4 to the pen drive input terminal 5 and is arranged when it receives an appropriate signal from the repetitive time trigger 12 to interrupt that signal line for the time being and to close instead a signal line for applying the ramp generator output to the pen drive input terminal 5 and when it receives another appropriate signal from the ramp generator 13 to interrupt the signal line from the ramp generator 13 and to re-close the signal line from the measuring device 4.

The code releaser 15 is connected to receive as well as signals from the time trigger 12 the output of the ramp generator 13. The code releaser is arranged to deliver to the recorder input terminal 9, provided that it has received an appropriate signal from the time trigger 12, sequentially WRITE and NOT-WRITE signals as the ramp signal at the ramp generator output passes sequentially through sub-ranges of its whole change in value which takes the recorder pen from the left extremity to the right extremity of its travel when the ramp signal is applied to the recorder input terminal 5, the code releaser deriving the WRITE and NOT-WRITE signals by reading sequentially the bits of the twenty-one bit current time information stored in the binary encoder 11. The twenty-one WRITE and NOT-WRITE signals are delivered as respective sub-ranges of the ramp signal are passed through which cause the pen to be passing through respective sub-ranges of its total traverse, that is to say, to be passing over respective chart zones. The time needed to record the current time on the chart in this way each hour is only short and two current time records on the chart made an hour apart may closely resemble the interrupted lines 21 and 22 drawn straght across the chart, one of which appears to provide an intersection with the trace 8.

In an operation once each hour that ensures a binary representation of current time on the chart, the first action of the time trigger 12 consists in delivering to the signal selector 14 a signal appropriate to cause the latter to apply to the pen drive input terminal 5 the output of the ramp generator 13 in place of the output of the measuring device 4 and in simultaneously delivering to the code releaser 15 a signal appropriate to cause the latter to apply to the recorder input terminal 9 a NOT-WRITE signal for the time being in place of the normal WRITE signal. Under the influence of the mentioned normal value of the ramp generator output the pen is caused to move to the left extremity of its possible travel from whatever position it had been occupying under the influence of the measuring device output; the pen does not mark the chart as it so moves.

The second action of the time trigger 12 takes place after a fixed time interval from its first action sufficient to ensure that the pen has certainly reached the left extremity of its possible travel and consists in applying a triggering pulse to the ramp generator 13, which then provides a ramp signal output both to the pen drive input terminal 5 and to the code releaser 15, and in simultaneously delivering to the code releaser a signal appropriate to cause the latter to read sequentially the twenty-one bits of the current-time information stored in the encoder 11 as the ramp signal delivered to the code releaser steadily changes from its initial value to its final value and to deliver to the recorder input terminal 9 a sequence of WRITE and NOT-WRITE signals according as the information bits read are 1 or 0.

The ramp generator 13 is arranged as soon as its ramp signal reaches the value that brings the pen to the right extremity of its possible travel to over-ride the signal from the repetitive time trigger 12 to the signal selector 14 and to cause the latter to interrupt the signal line to the recorder input terminal 5 from the ramp generator and to re-close the signal line from the measuring device 4; simultaneously the ramp generator delivers to the code releaser 15 a signal appropriate to ensure that the latter applies to the recorder input terminal a NOT-WRITE signal for the time being; and the output of the ramp generator is arranged to return to normal. The pen then returns to an appropriate location according to the value of the variable.

The third action of the time trigger 12 takes place after a fixed time interval from its second action sufficient to ensure that the pen has certainly been re-positioned according to the measuring device output and consists in delivering to the code releaser a signal appropriate to cause the latter to apply to the recorder input terminal 9 a WRITE signal until the next sequence of three time trigger actions is initiated approximately an hour later. The recorder thereupon continues to make the trace 8.

A sufficiently magnified view of where the line of the trace 8 and the line of any current time record, for example, the record 21, cross one another must reveal, as in FIG. 2, a gap between the part 8a of the trace 8 made prior to the current time record and the part 8b of the trace 8 made subsequent to the current time record. With reference to FIG. 2, at the end of the trace part 8a the pen, with its marking capability broken, moves to the left (NOT-WRITE path 23), later it moves from left to right (current time record 21) with its marking capability made and broken as it passes over the various zones of the chart and finally it moves back to the left with its marking capability broken (NOT-WRITE path 24) and resumes, after its marking capability has been re-made, the making of the trace 8 (subsequent trace part 8b). However, the time needed to make a current-time record on the chart each hour is only short and the temporary appropriation of the pen for the purpose generally scarcely constitutes for practical purposes a discontinuity of the trace 8 recording the variable.

The current time records on the chart are interpretable by reference to the marks and not-marks that constitute the record and to the chart zones to which the marks and not-marks apply. The appropriate chart zone boundaries may be printed or otherwise marked on the chart, as shown by the dotted lines in FIG. 3(a). If the non-marking of a zone is taken as an information bit 0 and the marking of a zone as an information bit 1, then the current time record 21 is first taken as the twenty-one bit sequence reproduced in FIG. 3(b). As previously mentioned, respective groups of these bits are allotted to hours, days, months and years, and to ascertain the groups reference may be made to a key. Such key is shown engraved on a scale 25 in FIG. 3(c), which scale is also of such dimensions that it may be used, held across the chart, to identify the chart zones even if they are not marked on the chart itself. On the scale 25 there is an upper row of twenty-one spaces 26 in which the twenty-one bit sequence FIG. 3(b) may be expungeably entered as shown in dotted representation. Below the row of spaces 26 the rule denotes how the bits entered in the spaces are grouped to designate the tens and units figures of the hour in the day and of the day in the month, the ten and units figures of the month in the year, all in binary coded decimal notation, and the units figure for the last digit in the date year. Using the engraved rule 25 of FIG. 3(c), the twenty-one bit sequence of FIG. 3(b) is read, FIG. 3(d), as 14 hours, 15 days, 9 months, 3 years, that is to say, FIG. 3(e), 2 p.m. on the 15th Sept. 1983 or 1993 or 2003 . . . , the date year to be attributed being unambiguous if it is known that the record cannot be ten years old.

As mentioned, the current-time records scarcely constitute discontinuities in the trace 8 recording the variable. The current-time records are immediately identifiable and distinguishable from the trace 8 since each consists of an interrupted line instead of a substantially continuous trace, a straight line instead of a sinuous one and moreover a line which extends across the whole width of the possible travel of the pen transversely to the said trace recording the variable. With a view to avoiding confusion with the graduations for the values of the variable, the chart zones of use for interpreting the current-time records need not be marked or printed continuously on the chart, but they should preferably be marked or printed at at least one location, for example, at the beginning and/or end of the chart, together with a key such as that of the rule 25, with which any rule may be checked before it is used for interpreting current-time records on the chart at a later date or by reference to which a rule 25 appropriate to the chart may be made.

In a chart record with the hours, days, months and years of recordal time indicated in the manner described, the recorded values of the variable are readily "identifiable as to time and date", to quote a proposed international specification dealing with recording marine pollution monitors. No knowledge of the recorder speed is required to name inter-hour moments such as minutes, for one has only to interpolate between the positions of successive recorded hours on the chart. No uncertainty can arise from a human omission to write the time and date on a chart when inserting it in the recorder or removing it therefrom.

It may be arranged as an alternative that the current-time records identify days not by their ordinal number in the month together with the ordinal number of the month in the year but by their ordinal number in the year; thus the 15th September in a non-leap year is the 258th day in the year and would be represented in binary-coded decimal code by a group 10/0101/1000. This procedure requires one information bit fewer.

It may be arranged as an alternative that the traverse with chart zones marked or unmarked indicates the time at which the traverse was executed, for each of the various numbers to be presented, in simple binary code instead of binary-coded-decimal representation. The so-called BCD representation is more readily mentally convertible back to a decimal representation but a presentation in simple binary code requires fewer information bits.

If the width of the chart compared with the number of chart-zones required to be allotted for current-time recording permits, it may be arranged that each time the pen is caused to make a traverse for a current time recording, the traverse extends over chart zones not allotted to current time information and the pen is caused to record on those chart zones in binary representation the current value of a second variable.

The time interval of one hour between successive current-time recordings on the chart may well be appropriate for some applications, for example, for marine pollution monitors where the variable to be recorded is the proportion of oil in water that may be pumped on occasions from a ship, e.g. an oil tanker, into the sea but for other application other time intervals may be more appropriate and it will be understood that minutes might be included in a binary representation of current time on the chart.

Figure 4:
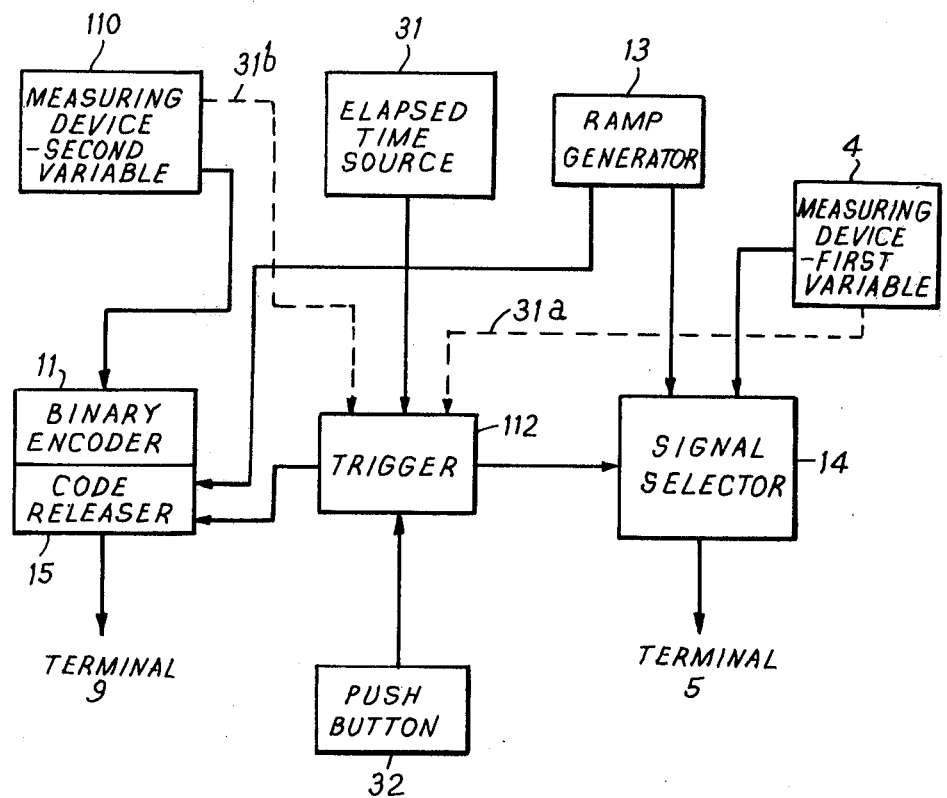

With reference to FIG. 4, which indicates a modification of the arrangement of FIG. 1 adapted for chart-recording, in place of current time, at certain moments or on certain occasions the current value of a second variable, the current time source 10 of FIG. 1 is removed and a second variable measuring device 110 together with an elapsed time source 31 is provided while a trigger 12 replaces the repetitive time trigger 12.

The second variable measuring device 110 is arranged to generate an analogue signal which is led to the binary encoder 11 which generates and holds within itself, changing them as the analogue signal varies, an array of binary digit signals which is representative of the value of the second variable. The elapsed time source 32 is arranged for sending periodically from the start of an experiment or process a triggering signal to the trigger 112, which is arranged when so triggered to execute the sequence of three actions described with reference to FIG. 1 and to the device 12 thereof. Thus when the elapsed time source 31 so dictates, the pen of the recorder 2, which is otherwise continuously recording the first variable value, is temporarily appropriated and caused to execute a traverse on the chart and in so doing to record the current value of the second variable on the chart in binary representation by marking or not marking chart zones crossed by the pen in the traverse and allotted to respective information bits for the second variable value; the record of the second variable on the chart may be interpreted with the aid of an engraved rule or otherwise as described with reference to FIGS. 1 to 3 and to the interpretation of current time records.

A push button 32 is provided which is capable of actuating the trigger 112 so that at any particular further moment at which the supervisor may consider that a binarily represented recording of the second variable value would be desirable he may cause the trigger 112 to execute the referred-to sequence of three actions.

In an alternative procedure the device 31 is removed or rendered inactive and the trigger 112 is, as shown by the broken signal line 31a, made responsive in a desired way to the first variable values, for example, in such a way as to actuate the trigger 112 each time the first variable trespasses in a rising sense past a predetermined upper value of the first variable or trespasses in a falling sense past a predetermined lower value of the first value.

In another alternative procedure, using neither the device 31 nor the signal line 31a, the trigger 112 is, as shown by the alternative broken signal line 31b, made responsive in a desired way to the second variable value; for example, the second variable might be the total amount of fluid that has passed a given point in a flow line from a given moment and the measuring device 110 might be arranged to actuate the trigger 112 each time, according to the measuring device 110, another 100 gallons, for example, has passed. This procedure may be of use in the paper-making industry, in which it is common to record continuously the viscosity of a long-cycle periodic flow of slurry. The measuring device 4 would therefore be arranged to measure this viscosity, and the recorder would record the value thereof. It may be useful, if a change in viscosity is indicated on the record, to be able to assign it subsequently to the appropriate part of the flow, but it may not be considered necessary to provide for continuously recording also the increasing quantity of slurry that has passed the viscosity-monitoring point. The measuring device 110 would therefore be arranged to measure the total amount of slurry that has passed the viscosity-monitoring point since the start of the cycle and could be arranged to actuate the trigger 112 each time another predetermined number of gallons has passed. The apparatus then records intermittently the integrated quantity of slurry passing the point, recording it on the same chart that is provided for the viscosity record and by the same pen but providing records of the integrated quantity that are completely distinguishable from the viscosity record. For any particular change in the recorded viscosity the corresponding point in the flow may be found by interpolation between adjacent flow recordings.

We claim:

1. A recording system comprising:
    a chart recorder, having a movable pen arranged for providing a record on a moving chart of the varying values of a first variable;
    means for causing the pen repetitively, at intervals or at predetermined times to execute a traverse on the chart to record in binary representation the current value of a second variable on the chart by marking or not marking chart zones crossed in the traverse and allotted to respective information bits for the value of the second variable.

2. A recording system as claimed in claim 1 including, for a repetitive recording of current-time on the chart in binary representation, means for binarily encoding signals from a current-time source into an array of current-time information bits respective groups of which pertain to hours of the day, days of the month, months of of the year and years.

3. A recording system as claimed in claim 1, including, for a repetitive recording of current-time on the chart in binary representation, means for binarily encoding signals from a current-time source into an array of current-time information bits respective groups of which pertain to hours of the day, days in the year and years.

4. A recording system as claimed in claim 1, including, means continuously to encode binarily signals from a measuring device for said second variable and timing means to cause periodically the current binarily encoded value of said second variable to be recorded binarily on the chart by a traverse of the pen.

5. A recording system as claimed in claim 1 including means arranged continuously to encode binarily signals from a measuring device for said second variable and means to cause the current binarily encoded value of the second variable to be recorded binarily on the chart by a traverse of the pen every time the first-mentioned variable rises above a predetermined upper value and/or falls below a predetermined lower value.

6. A recording system as claimed in claim 1, said second variable being one having an increasing magnitude including means arranged continuously to encode binarily signals from a measuring device for the increasing-magnitude variable and means to cause the binarily encoded value of the increasing-magnitude variable to be binarily recorded on the chart by a traverse of the pen every time the increasing-magnitude variable differs in value by a predetermined fixed amount from its previous binarily recorded value.

7. A recording system as claimed in claim 1 including a current-time source;

means for binarily encoding signals from said current-time source into an array of current-time information bits;

a ramp generator for generating when actuated a progressively changing signal capable of causing the moving pen to execute a traverse on the chart;

a code releaser connected to receive the progressively changing signal from the ramp generator and in response thereto to read the array of current-time information bits and deliver a sequence of WRITE or NOT-WRITE signals to the recorder corresponding to the 0 and 1 values of the current-time information bits; and a repetitive time trigger connected to actuate said ramp generator at predetermined intervals of time.

* * * * *